(12) United States Patent
Yang et al.

(10) Patent No.: US 10,848,209 B2
(45) Date of Patent: Nov. 24, 2020

(54) SOUNDING REFERENCE SIGNAL (SRS) SWITCHING CAPABILITY AND CONFIGURATION

(71) Applicant: QUALCOMM Incorporated, San Diego, CA (US)

(72) Inventors: Wei Yang, San Diego, CA (US); Peter Gaal, San Diego, CA (US); Yi Huang, San Diego, CA (US); Gokul Sridharan, San Diego, CA (US); Amir Aminzadeh Gohari, Sunnyvale, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/595,304

(22) Filed: Oct. 7, 2019

(65) Prior Publication Data
US 2020/0112349 A1     Apr. 9, 2020

Related U.S. Application Data

(60) Provisional application No. 62/743,506, filed on Oct. 9, 2018.

(51) Int. Cl.
*H04L 1/02* (2006.01)
*H04B 7/0417* (2017.01)
*H04W 52/42* (2009.01)
*H04B 7/06* (2006.01)

(52) U.S. Cl.
CPC ........... *H04B 7/0417* (2013.01); *H04B 7/063* (2013.01); *H04B 7/0628* (2013.01); *H04W 52/42* (2013.01)

(58) Field of Classification Search
CPC . H04L 27/2647; H04L 5/0007; H04L 1/0618; H04L 1/06; H04W 36/0061; H04W 36/08; H04W 36/36
USPC .......................................... 375/267, 130, 260
See application file for complete search history.

(56) References Cited

U.S. PATENT DOCUMENTS

| | | |
|---|---|---|
| 2013/0272229 A1 | 10/2013 | Dinan |
| 2017/0279580 A1 | 9/2017 | Chen et al. |
| 2017/0294951 A1* | 10/2017 | Weissman ............ H04B 7/0686 |
| 2019/0159080 A1* | 5/2019 | Zhang ................... H04W 36/00 |
| 2019/0297603 A1* | 9/2019 | Guo ....................... H04L 5/0051 |
| 2019/0312617 A1* | 10/2019 | Wernersson ........ H04W 52/325 |

FOREIGN PATENT DOCUMENTS

WO      2017194829 A1      11/2017

OTHER PUBLICATIONS

International Search Report and Written Opinion—PCT/US2019/055218—ISA/EPO—Feb. 12, 2020.

* cited by examiner

*Primary Examiner* — Khai Tran
(74) *Attorney, Agent, or Firm* — Harrity & Harrity/Qualcomm Inc.; Nerrie M. Zohn

(57) ABSTRACT

Some techniques and apparatuses described herein permit a user equipment (UE) to be configured by a base station using a configuration that is not the same as a capability reported to the base station by the UE, thereby increasing flexibility in configurations and communication between the UE and the base station.

58 Claims, 9 Drawing Sheets

SOUNDING REFERENCE SIGNAL (SRS) SWITCHING CAPABILITY AND CONFIGURATION

CROSS-REFERENCE TO RELATED APPLICATION

This application claims priority to U.S. Provisional Patent Application No. 62/743,506, filed on Oct. 9, 2018, entitled "SOUNDING REFERENCE SIGNAL (SRS) SWITCHING CAPABILITY AND CONFIGURATION," which is hereby expressly incorporated by reference herein.

BACKGROUND

Field

Aspects of the present disclosure generally relate to wireless communication and to techniques and apparatuses for sounding reference signal (SRS) switching capability and configuration.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In a 5G radio access technology (RAT) and/or a similar type of RAT, a UE may be capable of communicating using 4-layer multiple-input multiple-output (MIMO). For example, a UE may support multi-layer MIMO transmissions, such as 4-layer MIMO transmissions for UEs with 4 transmit chains. For a UE that supports 4-layer MIMO, the UE may have 4 transmit chains with a maximum transmit power of, for example, 23 decibel-milliwatts (dBm) per transmit chain. Such a UE may be capable of operating in one of multiple modes, including a single Tx mode (e.g., using a single Tx chain) with a maximum output power of 29 dBm (e.g., achieved by combining transmissions from four antennas into a single virtualized antenna port), a 2 Tx MIMO mode (e.g., using two Tx chains) with a maximum output power of 26 dBm on each of the two Tx chains, and a 4 Tx MIMO mode (e.g., using 4 Tx chains) with a maximum output power of 23 dBm per Tx chain.

In some cases, the UE may signal, to a base station, the maximum output power of the UE and the MIMO capability of the UE (e.g., a number of Tx chains supported by the UE, such as single Tx, 2 Tx, 4 Tx, and/or the like). Additionally, or alternatively, the UE may signal a sounding reference signal (SRS) port switching capability of the UE, such as whether the UE needs to perform antenna switching (e.g., antenna port switching, or port switching) to transmit SRS for downlink channel estimation. For example, if the UE indicates an SRS port switching capability of T=R (e.g., indicating that the number of Tx chains and the number of Rx chains of the UE are equal), then the UE may not need to perform antenna switching to transmit SRS for downlink channel estimation by the base station. If the UE indicates an SRS port switching capability of T≠R, then the UE may need to perform antenna switching to transmit SRS for downlink channel estimation of all of the downlink channels for the UE.

However, the UE may not be able to operate in a mode different than that reported to the base station. For example, if the UE reports a number of Tx chains, a number of uplink MIMO layers, and/or an SRS port switching capability, then the UE may be required to operate using that number of Tx chains, that number of uplink MIMO layers, and/or that SRS port switching capability. This may reduce flexibility of configuration by the base station, leading to poor performance in some scenarios. Some techniques and apparatuses described herein permit a UE to be configured by a base station using a configuration that is not the same as a capability reported to the base station by the UE, thereby increasing flexibility in configurations and communication between the UE and the base station.

In an aspect of the disclosure, a method, a user equipment (UE), an apparatus, and a computer program product are provided.

In some aspects, the method may by performed by a UE. The method may include reporting, to a base station, an indication of a number of transmit chains of the UE, a maximum transmit power associated with the UE, and a sounding reference signal (SRS) port switching capability of the UE; receiving, from the base station, a transmission mode configuration based at least in part on reporting the indication; and communicating with the base station using the transmission mode configuration.

In some aspects, the UE may include a memory and one or more processors operatively coupled to the memory. The memory and the one or more processors may be configured to report, to a base station, an indication of a number of transmit chains of the UE, a maximum transmit power associated with the UE, and a sounding reference signal (SRS) port switching capability of the UE; receive, from the base station, a transmission mode configuration based at least in part on reporting the indication; and communicate with the base station using the transmission mode configuration.

In some aspects, the apparatus may include means for reporting, to a base station, an indication of a number of transmit chains of the apparatus, a maximum transmit power associated with the apparatus, and a sounding reference signal (SRS) port switching capability of the apparatus; means for receiving, from the base station, a transmission mode configuration based at least in part on reporting the indication; and means for communicating with the base station using the transmission mode configuration.

In some aspects, the computer program product may include a non-transitory computer-readable medium storing one or more instructions. The one or more instructions, when executed by one or more processors of a UE, may cause the one or more processors to report, to a base station, an indication of a number of transmit chains of the UE, a maximum transmit power associated with the UE, and a sounding reference signal (SRS) port switching capability of the UE; receive, from the base station, a transmission mode configuration based at least in part on reporting the indication; and communicate with the base station using the transmission mode configuration.

In some aspects, the method may by performed by a base station. The method may include receiving, from a user equipment (UE), an indication of a number of transmit chains of the UE, a maximum transmit power associated with the UE, and a sounding reference signal (SRS) port switching capability of the UE; determining a transmission mode configuration based at least in part on the indication; and transmitting, to the UE, an indication of the transmission mode configuration.

In some aspects, the base station may include a memory and one or more processors operatively coupled to the memory. The memory and the one or more processors may be configured to receive, from a user equipment (UE), an indication of a number of transmit chains of the UE, a maximum transmit power associated with the UE, and a sounding reference signal (SRS) port switching capability of the UE; determine a transmission mode configuration based at least in part on the indication; and transmit, to the UE, an indication of the transmission mode configuration.

In some aspects, the apparatus may include means for receiving, from a user equipment (UE), an indication of a number of transmit chains of the UE, a maximum transmit power associated with the UE, and a sounding reference signal (SRS) port switching capability of the UE; means for determining a transmission mode configuration based at least in part on the indication; and means for transmitting, to the UE, an indication of the transmission mode configuration.

In some aspects, the computer program product may include a non-transitory computer-readable medium storing one or more instructions. The one or more instructions, when executed by one or more processors of a base station, may cause the one or more processors to receive, from a user equipment (UE), an indication of a number of transmit chains of the UE, a maximum transmit power associated with the UE, and a sounding reference signal (SRS) port switching capability of the UE; determine a transmission mode configuration based at least in part on the indication; and transmit, to the UE, an indication of the transmission mode configuration.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
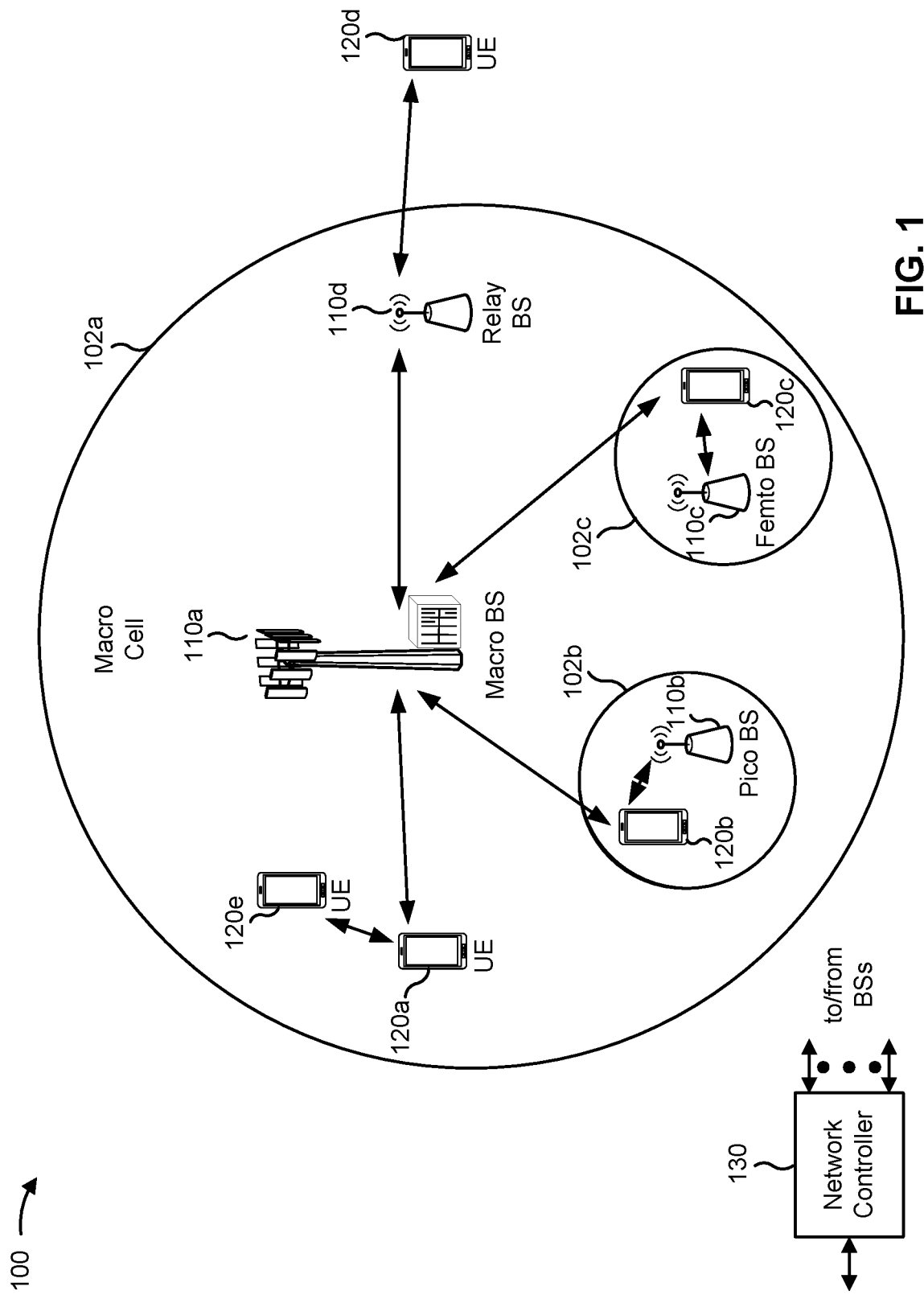
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what was described with regard to FIG. 1.

Figure 2:
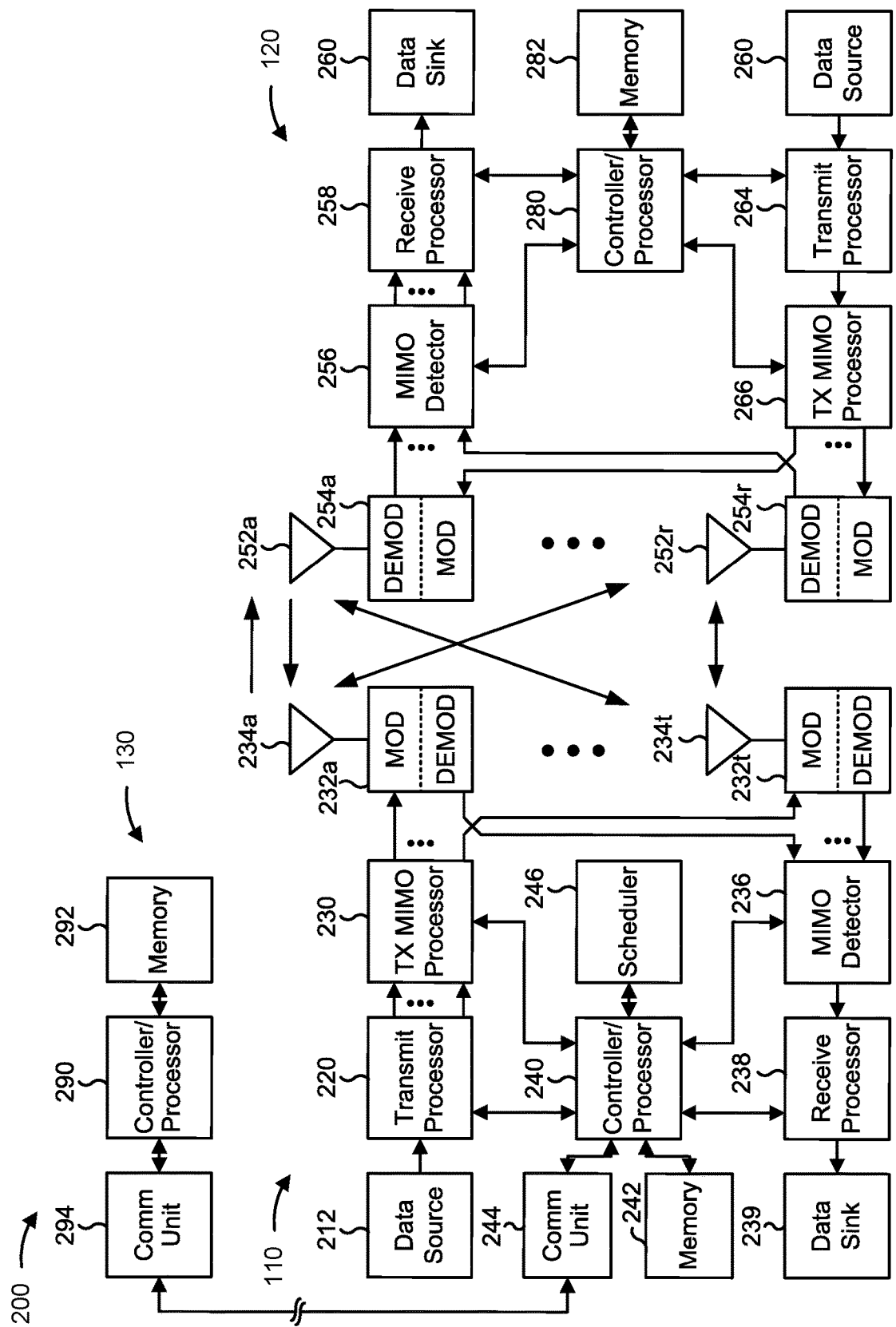
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with SRS switching capability and configuration, as described in more detail elsewhere herein. For example, controller/processor 240 of base station 110, controller/processor 280 of UE 120, and/or any other component(s) of FIG. 2 may perform or direct operations of, for example, method 400 of FIG. 4, method 500 of FIG. 5, method 600 of FIG. 6, method 700 of FIG. 7, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what was described with regard to FIG. 2.

In a 5G radio access technology (RAT) and/or a similar type of RAT, a UE may be capable of communicating using 4-layer multiple-input multiple-output (MIMO). For example, a UE may support multi-layer MIMO transmissions, such as 4-layer MIMO transmissions for UEs with 4 transmit chains. For a UE that supports 4-layer MIMO, the UE may have 4 transmit chains with a maximum transmit power of, for example, 23 decibel-milliwatts (dBm) per transmit chain. Such a UE may be capable of operating in one of multiple modes, including a single Tx mode (e.g., using a single Tx chain) with a maximum output power of 29 dBm (e.g., achieved by combining transmissions from four antennas into a single virtualized antenna port), a 2 Tx MIMO mode (e.g., using two Tx chains) with a maximum output power of 26 dBm on each of the two Tx chains, and a 4 Tx MIMO mode (e.g., using 4 Tx chains) with a maximum output power of 23 dBm per Tx chain.

In some cases, the UE may signal, to a base station, the maximum output power of the UE and the MIMO capability of the UE (e.g., a number of Tx chains supported by the UE, such as single Tx, 2 Tx, 4 Tx, and/or the like). Additionally, or alternatively, the UE may signal a sounding reference signal (SRS) port switching capability of the UE, such as whether the UE needs to perform antenna switching (e.g., also referred to as antenna port switching or port switching) to transmit SRS for downlink channel estimation. For example, if the UE indicates an SRS port switching capability of T=R (e.g., indicating that the number of Tx chains and the number of Rx chains of the UE are equal), then the UE may not need to perform antenna switching to transmit SRS for downlink channel estimation by the base station. If the UE indicates an SRS port switching capability of T≠R, then the UE may need to perform antenna switching to transmit SRS for downlink channel estimation of all of the downlink channels for the UE.

However, the UE may not be able to operate in a mode different than that reported to the base station. For example, if the UE reports a number of Tx chains, a number of uplink MIMO layers, and/or an SRS port switching capability, then the UE may be required to operate using that number of Tx chains, that number of uplink MIMO layers, and/or that SRS port switching capability. This may reduce flexibility of configuration by the base station, leading to poor performance in some scenarios. Some techniques and apparatuses described herein permit a UE to be configured by a base station using a configuration that is not the same as a capability reported to the base station by the UE, thereby increasing flexibility in configurations and communication between the UE and the base station.

Figure 3:
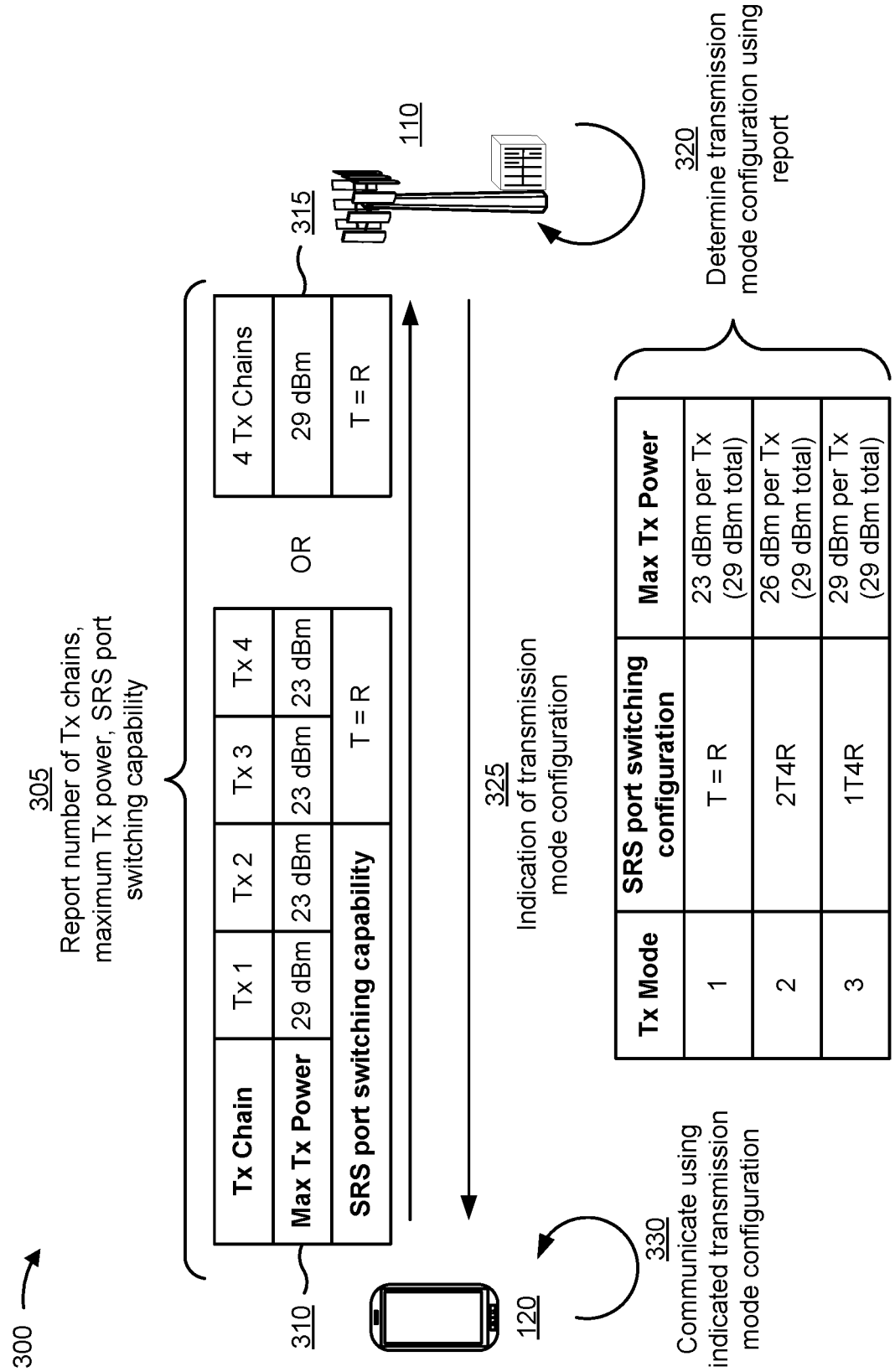
FIG. 3 is a diagram illustrating an example of sounding reference signal (SRS) switching capability and configuration.

FIG. 3 is a diagram illustrating an example 300 of SRS switching capability and configuration. As shown in FIG. 3, a UE 120 may communicate with a base station 110.

As shown by reference number 305, the UE 120 may report, to the base station 110, an indication of a number of transmit (Tx) chains of the UE 120, a maximum transmit power associated with the UE 120, and a sounding reference signal (SRS) port switching capability of the UE 120. For example, the UE 120 may determine the number of transmit chains included in the UE 120, the maximum transmit power, and/or an SRS port switching capability of the UE 120. In some aspects, this information may be stored in memory of the UE 120 (and may be due to a hardware configuration of the UE 120 that cannot be changed), and may be retrieved from the memory. In some aspects, the UE 120 may report the indication in a radio resource control (RRC) message, such as an RRC configuration message, an RRC reconfiguration message, and/or the like. Additionally, or alternatively, the UE 120 may report the indication in a UE capability report.

In example 300, the UE 120 is capable of communicating using four multiple-input multiple-output (MIMO) layers, and includes four transmit chains. The first transmit chain (Tx 1) has a maximum transmit power of 29 decibel-milliwatts (dBm), the second transmit chain (Tx 2) has a maximum transmit power of 23 dBm, the third transmit chain (Tx 3) has a maximum transmit power of 23 dBm, and the fourth transmit chain (Tx 4) has a maximum transmit power of 23 dBm. For explanatory purposes, FIG. 3 shows a table that identifies the four transmit chains (e.g., as Tx 1 through Tx 4) and corresponding maximum transmit powers. However, in some aspects, the UE 120 may report a number of maximum transmit powers (e.g., in example 300, four maximum transmit powers), and this number may indicate the number of transmit chains of the UE 120.

In some aspects, the maximum transmit power associated with the UE 120 may include a maximum transmit power per transmit chain (e.g., a separate maximum transmit power reported for each transmit chain), as described above, and as shown by reference number 310. Additionally, or alternatively, the maximum transmit power associated with the UE 120 may include a maximum transmit power aggregated across all of the transmit chains, such as a maximum transmit power obtained by summing (e.g., linearly) the maximum transmit powers for each transmit chain (e.g., four transmit chains with a maximum transmit power of 23 dBm each would sum to an aggregate maximum transmit power of 29 dBm). The maximum transmit power aggregated across all of the transmit chains may represent a power class of the UE 120, in some aspects. In this case, the UE 120 may report a single maximum transmit power, rather than multiple maximum transmit powers, as shown by reference number 315.

In example 300, the maximum transmit power per Tx chain is imbalanced (e.g., not equal across all Tx chains of the UE 120). In some aspects, the maximum transmit power per Tx chain may be balanced (e.g., equal across all Tx chains of the UE 120). In some aspects, the UE 120 may report a power class for the UE 120 using the maximum of the maximum transmit powers per transmit chain (e.g., in example 300, 29 dBm).

As further shown, in example 300, the UE 120 has an SRS port switching capability of T=R, indicating that the number of transmit chains of the UE 120 is equal to the number of receive chains of the UE 120. As a result, the UE 120 does not need to perform antenna switching (e.g., between Tx chains, Tx antennas, Tx antenna ports, and/or the like) to transmit SRS for downlink channel estimation corresponding to all of the Rx chains (e.g., because there are as many Tx chains as Rx chains in the UE 120). For example, for a 4T4R UE with 4 Tx chains and 4 Rx chains, the UE 120 may transmit an SRS on each of the 4 Tx chains to sound the channels for each of the 4 Rx chains. A 4T4R UE is able to transmit 4 SRS ports simultaneously and/or concurrently.

In some aspects, the UE 120 may report an SRS port switching capability where T≠R, indicating that the number of transmit chains of the UE 120 is not equal to the number of receive chains of the UE 120. As a result, the UE 120 may need to perform antenna switching (e.g., between Tx chains, Tx antennas, Tx antenna ports, and/or the like) to transmit SRS for downlink channel estimation corresponding to all of the Rx chains (e.g., because there are fewer Tx chains than Rx chains in the UE 120). For example, for a 2T4R UE with 2 Tx chains and 4 Rx chains, the UE 120 may transmit an SRS twice on each of the 2 Tx chains (e.g., using antenna switching) to sound the channels for each of the 4 Rx chains. Similarly, for a 1T4R UE with 1 Tx chain and 4 Rx chains, the UE 120 may transmit SRS four times on the single Tx chain (e.g., using antenna switching) to sound the channels for each of the 4 Rx chains.

Additionally, or alternatively, the UE 120 may report that, in a band in a band combination, the UE 120 supports a specific SRS port switching capability (e.g., T=R, 1T4R, and/or the like), but only if SRS resources are not shared (e.g., different resources are used for the physical uplink shared channel (PUSCH) and for SRS) and the UE 120 will have a power reduction for SRS transmissions used for DL CSI acquisition. In other words, if SRS transmission is used for UL CSI acquisition, the maximum transmit power for SRS may be P1. Similarly, for the same UE, the maximum transmit power for PUSCH will be P1. On the other hand, for the same UE, if the SRS transmission is used for DL CSI acquisition, the maximum transmit power for SRS may be P2<P1. In some aspects, SRS resources are shared if the same SRS resources are used for DL CSI acquisition and UL CSI acquisition at the same time. Conversely, SRS resources are not shared if the same SRS resources are used for DL CSI acquisition and UL CSI acquisition at the same time. If SRS resources are not shared, then the base station 110 configures separate SRS resources for DL CSI acquisition and UL CSI acquisition. If the SRS resources are not shared, an antenna port for the PUSCH may be virtualized, and an antenna port for the SRS resources for DL CSI acquisition may not be virtualized. A virtualized antenna port may refer to combining, by the UE 120, transmit signals from more than one transmit chain and transmitting the combined transmit signals via a single (virtualized) antenna port. Additionally, or alternatively, the UE 120 may report that, in a band in a band combination, the UE 120 supports a specific SRS port switching capability (e.g., T=R, 1T4R, and/or the like) if resources for the PUSCH and the SRS are shared (e.g., if the same SRS resources are used for DL CSI acquisition and UL CSI acquisition at the same time). In this case, there may be a power reduction for the PUSCH and all SRS, and transmit chains for the PUSCH and the SRS may not be virtualized. In some aspects, if resources for the PUSCH and SRS are shared, the maximum transmit power for PUSCH, SRS for DL CSI acquisition, and SRS for UL CSI acquisition are all the same Additionally, or alternatively, the UE 120 may report a first set of UE capabilities for a first case where SRS resources overlap (e.g., a case where configured SRS resources for a downlink SRS use case and for an uplink SRS use case overlap) and a second set of UE capabilities for a second case where SRS resources do not overlap (e.g., a case where configured SRS resources for a downlink SRS use case and for an uplink SRS use case do not overlap). The first set of UE capabilities and the second set of UE capabilities may include an indication of a maximum transmit power for an uplink shared data channel, SRS transmissions for downlink CSI acquisition, and SRS transmissions for uplink CSI acquisition. In some aspects, the UE may report a set of UE capabilities per band in a band combination. In some aspects, each UE capability, of the first set of UE capabilities, and each UE capability, of the second set of UE capabilities, includes an indication of a respective maximum transmit power for the uplink shared data channel and for at least one of the SRS transmissions for the downlink CSI or the SRS transmissions for the uplink CSI. As used herein, a downlink SRS use case may refer to SRS configured for DL CSI acquisition, Similarly, an uplink SRS use case may refer to SRS configured for UL CSI acquisition.

In some aspects, for a UE capability in the first set of UE capabilities for the first case where SRS resources overlap (e.g., where SRS resources for downlink CSI acquisition and uplink CSI acquisition overlap), the indicated maximum transmit power is the same for the uplink shared data channel and for at least one of the SRS transmissions for the downlink CSI or the SRS transmissions for the uplink CSI. In some aspects, for a UE capability in the second set of UE capabilities for the second case where SRS resources do not overlap (e.g., where SRS resources for downlink CSI acquisition and uplink CSI acquisition do not overlap), the indicated maximum transmit power is different for the uplink shared data channel and for at least one of the SRS transmissions for the downlink CSI or the SRS transmissions for the uplink CSI. As used herein, an overlap in SRS resources may refer to an overlap in SRS resources for downlink CSI acquisition and uplink CSI acquisition.

For example, when there is no overlap of SRS resources between a downlink SRS use case and an uplink SRS use case, then the UE 120 may report, per band in a band combination, a capability for an uplink SRS use case that indicates a number of Tx chains of the UE 120, a number of Rx chains of the UE 120, and a maximum transmit power of the UE 120. Similarly, when there is no overlap of SRS resources between a downlink SRS use case and an uplink SRS use case, then the UE 120 may report, per band in a band combination, a capability for a downlink SRS use case that indicates a number of Tx chains of the UE 120, a number of Rx chains of the UE 120, and a maximum transmit power of the UE 120. As another example, when there is an overlap of SRS resources between a downlink SRS use case and an uplink SRS use case (e.g., when SRS resources are allowed to be shared between the uplink use case and the downlink use case), then the UE 120 may report, per band in a band combination, a common capability, for both the uplink SRS use case and the downlink SRS use case, that indicates a number of Tx chains of the UE 120, a number of Rx chains of the UE 120, and a maximum transmit power of the UE 120. In either case (e.g., with or without overlap of SRS resources), the UE 120 may indicate support for multiple combinations of a number of Tx chains and a number of Rx chains (e.g., 1T4R, 2T4R, 4T4R, and/or the like).

As an example, consider a UE with 4 transmit chains, each with a maximum power of 23 dBm. In this case, the UE would report a power class of 29 dBm (e.g., due to transmit chain combining). The below table indicates a maximum UE transmit power in different transmission modes.

| | With UL/DL SRS resource sharing | | | Without UL/DL SRS resource sharing | | |
|---|---|---|---|---|---|---|
| | SRS Tx port switching capability | | | | | |
| | T = R (4T4R) | 2T4R | 1T4R | T = R (4T4R) | 2T4R | 1T4R |
| Max UL SRS power (dBm) | 29 | 26 | 23 | 29 | 29 | 29 |
| Max PUSCH power (dBm) | 29 | 26 | 23 | 29 | 29 | 29 |
| Max DL SRS power (dBm) | 29 | 26 | 23 | 29 | 26 | 23 |

In the above table, each column represents a communication scenario in which the UE could operate. In some aspects, the UE may report the values in a column of the table as a capability, along with an indication of whether an SRS resource can be shared between downlink CSI acquisition and uplink CSI acquisition. In some aspects, the UE may report the values in two columns of the table as a capability, with a first set of values from a first column for the case where SRS resources are shared between downlink CSI acquisition and uplink CSI acquisition, and a second set of values from a second column for the case where SRS resources are not shared between downlink CSI acquisition and uplink CSI acquisition. In some aspects, the UE may report the values in all columns of the table, along with an indication of whether an SRS resource can be shared between downlink CSI acquisition and uplink CSI acquisition.

Continuing with the above example, the UE 120 may report all or a subset of the following capabilities per band in a band combination. A first capability may indicate support for 4T4R with a maximum power of 29 dBm for both PUSCH and SRS (both for uplink and downlink use cases) if SRS resources overlap between uplink and downlink use cases. A second capability may indicate support for 2T4R with a maximum transmit power of 26 dBm for both PUSCH and SRS (both uplink and downlink use cases) if SRS resources overlap between uplink and downlink use cases. A third capability may indicate support for 1T4R with a maximum transmit power of 23 dBm for both PUSCH and SRS (both uplink and downlink use cases) if SRS resources overlap between uplink and downlink use cases. A fourth capability may indicate support for 4T4R with a maximum transmit power of 29 dBm for PUSCH and SRS (both uplink and downlink use cases) if SRS resources do not overlap between uplink and downlink use cases. A fifth capability may indicate support for 2T4R with a maximum transmit power of 29 dBm for PUSCH and SRS for uplink use case, and 26 dBm for SRS for downlink use case, if SRS resources do not overlap. A sixth capability may indicate support for 1T4R with a maximum transmit power of 29 dBm for PUSCH and SRS for uplink use case, and 26 dBm for SRS for downlink use case, if SRS resources do not overlap.

In some aspects, the first set of UE capabilities includes a first subset of UE capabilities and the second set of UE capabilities includes a second subset of UE capabilities. The first subset and the second subset may indicate support for at least one of a number of transmit chains used by the UE or a number of receive chains used by the UE, and at least one of: a maximum transmit power for the uplink shared data channel, a maximum transmit power for the SRS transmissions for downlink CSI acquisition, a maximum transmit power for the SRS transmissions for uplink CSI acquisition, or a combination thereof. In some aspects, the UE 120 may report that the UE 120 supports SRS resource sharing, may report a combination of Tx and Rx antennas (e.g., 1T4R, 2T4R, 4T4R, and/or the like), and may report a maximum transmit power for PUSCH communications, uplink SRS communications, and/or downlink SRS communications for that combination of Tx and Rx antennas for the case where the UE 120 supports SRS resource sharing. Additionally, or alternatively, the UE 120 may report that the UE 120 does not support SRS resource sharing, may report a combination of Tx and Rx antennas (e.g., 1T4R, 2T4R, 4T4R, and/or the like), and may report a maximum transmit power for PUSCH communications, uplink SRS communications, and/or downlink SRS communications for that combination of Tx and Rx antennas for the case where the UE 120 does not support SRS resource sharing. In some aspects, the UE 120 may report a maximum transmit power for PUSCH communications, a maximum transmit power for uplink SRS communications, and/or a maximum transmit power for downlink SRS communications for multiple combinations of Tx and Rx antennas and/or for different cases where the UE 120 supports SRS resource sharing or does not support SRS resource sharing.

As shown by reference number 320, the base station 110 may determine a transmission mode configuration based at least in part on the indication received from the UE 120 (e.g., the report from the UE 120 indicating the number of transmit chains, the maximum transmit power per transmit chain, and/or the SRS port switching capability of the UE 120). In some aspects, the transmission mode configuration may relate to SRS port switching (e.g., switching antennas and/or antenna ports to transmit SRS on those antennas and/or antenna ports). Additionally, or alternatively, the transmission mode configuration may relate to a number of uplink MIMO layers and/or transmit chains to be used by the UE 120. Thus, in some aspects, the transmission mode configuration may be referred to as an SRS transmission mode configuration, an uplink MIMO transmission mode configuration, a transmit chain transmission mode configuration, and/or the like.

Fore example, the transmission mode configuration may indicate an SRS port switching configuration to be used by the UE 120. In some aspects, the SRS port switching configuration indicated by the base station 110 may be different from an SRS port switching capability reported by the UE 120, thereby increasing flexibility in configuring the UE 120. In some aspects, the UE 120 may report a maximum capability (e.g., a ceiling) of the UE 120, and the base station 110 may select a capability that is the same as the maximum capability or that is a lesser capability than the maximum capability. For example, in example 300, where the UE 120 reports an SRS port switching capability of T=R (e.g., 4T4R), the base station 110 may select from a first SRS port switching configuration of T=R (e.g., shown for a first transmission mode, or Tx Mode 1), a second SRS port switching configuration of 2T4R (e.g., shown for a second transmission mode, or Tx Mode 2), or a third SRS port switching configuration of 1T4R (e.g., shown for a third transmission mode, or Tx Mode 3). In this case, T=R is the maximum capability, and 2T4R and 1T4R are lesser capabilities. For the case of a maximum capability of 2T4R, a lesser capability may be 1T4R.

As another example, when the UE 120 reports an SRS port switching capability of 2T4R (an example of T≠R), the base station 110 may select from an SRS port switching configuration of 2T4R or an SRS port switching configuration of 1T4R. Thus, the base station 110 may select the SRS port switching capability indicated by the UE 120, or may select a different SRS port switching capability depending on the number of Tx chains and the SRS port switching capability indicated by the UE 120 (e.g., ensuring that the base station 110 does not configure the UE 120 to use more Tx chains than the number included in the UE 120).

Additionally, or alternatively, the transmission mode configuration may indicate a number of transmit chains and/or a number of uplink MIMO layers to be used by the UE 120. In some aspects, the number of transmit chains and/or uplink MIMO layers indicated by the base station 110 may be different from a number of transmit chains and/or uplink MIMO layers reported by the UE 120, thereby increasing flexibility in configuration the UE 120. For example, in example 300, where the UE 120 reports four transmit chains, the base station 110 may configure the UE 120 to use four transmit chains (e.g., shown for Tx Mode 1, with T=R or 4T4R), may configure the UE 120 to use two transmit chains (e.g., shown for Tx Mode 2, with 2T4R), may configure the UE 120 to use one transmit chain (e.g., shown for Tx Mode 3, with 1T4R), and/or the like, As another example, when the UE 120 reports an SRS port switching capability of 2T4R (an example of T≠R), the base station 110 may configure the UE 120 to use two transmit chains (e.g., 2T4R) or one transmit chain (e.g., 1T4R). Thus, the base station 110 may select the number of Tx chains indicated by the UE 120, or may select a different (e.g., lesser) number of Tx chains depending on the number of Tx chains indicated by the UE 120 (e.g., ensuring that the base station 110 does not configure the UE 120 to use more Tx chains than the number included in the UE 120).

Additionally, or alternatively, the transmission mode configuration may indicate a maximum transmit power for the UE 120 and/or a maximum transmit power per transmit chain of the UE 120. For example, the transmission mode configuration may indicate a first transmission mode indicating a first maximum transmit power and indicating that a number of transmit chains is equal to a number of receive chains (e.g., T=R, where the UE 120 is configured to operate in a mode where the number of transmit chains is equal to the number of receive chains). In example 300, the first maximum transmit power for the first transmission mode is shown as 23 dBm per transmit chain for an aggregate maximum transmit power of 29 dBm. As further shown, in the first transmission mode, the number of transmit chains is configured to be equal to the number of receive chains.

Additionally, or alternatively, the transmission mode configuration may indicate a second transmission mode indicating a second maximum transmit power and indicating that a number of transmit chains is not equal to a number of receive chains (e.g., T≠R or 2T4R, where the UE 120 is configured to operate in a mode where the number of transmit chains (2) is not equal to the number of receive chains (4)). In example 300, the second maximum transmit power for the second transmission mode is shown as 26 dBm per transmit chain for an aggregate maximum transmit power of 29 dBm. As further shown, in the second transmission mode, the number of transmit chains (two) is configured to be different from the number of receive chains (four).

Additionally, or alternatively, the transmission mode configuration may indicate a third transmission mode indicating a third maximum transmit power and indicating that a number of transmit chains is not equal to a number of receive chains (e.g., T R or 1T4R, where the UE 120 is configured to operate in a mode where the number of transmit chains (1) is not equal to the number of receive chains (4)). In example 300, the third maximum transmit power for the third transmission mode is shown as 29 dBm per transmit chain for an aggregate maximum transmit power of 29 dBm. As further shown, in the third transmission mode, the number of transmit chains (one) is configured to be different from the number of receive chains (four).

Thus, the transmission mode configuration may indicate, for example, a number of transmit chains to be used by the UE 120, a number of receive chains to be used by the UE 120, a number of MIMO layers for the UE 120, an SRS port switching configuration for the UE 120, a maximum transmit power aggregated across all of the transmit chains, a maximum transmit power per indicated transmit chain, and/or the like. As indicated above, the SRS port switching configuration indicated to the UE 120 may be different from the SRS port switching capability reported by the UE 120, thereby permitting greater flexibility in configuring the UE 120. For example, the SRS port switching capability reported by the UE 120 may indicate an equal number of transmit chains and receive chains (e.g., T=R), and the SRS port switching configuration indicated to the UE 120 may indicate an unequal number of transmit chains and receive chains (e.g., T≠R, such as 2T4R, 1T4R, and/or the like).

In some aspects, the base station 110 may determine the transmission mode configuration for the UE 120 (e.g., by selecting a transmission mode, such as one of the transmission modes described above) based at least in part on the number of transmit chains of the UE 120, one or more maximum transmit powers corresponding to those transmit chains, the combination of maximum transmit powers for those transmit chains (e.g., an aggregated maximum transmit power), an SRS port switching capability reported by the UE 120, and/or the like. Additionally, or alternatively, the base station 110 may determine the transmission mode configuration based at least in part on a configuration of the base station 110, other information reported by and/or measured from the UE 120 (e.g., a signal strength parameter and/or the like), network traffic conditions at the base station 110, and/or the like.

As shown by reference number 325, the base station 110 may transmit, and the UE 120 may receive, an indication of the transmission mode configuration to be used by the UE 120 (e.g., to communicate with the base station 110, to transmit SRS on different antennas and/or antenna ports, and/or the like). In some aspects, the transmission mode configuration may be indicated and/or modified in an RRC message, downlink control information (DCI), a media access control (MAC) control element (CE), and/or the like. In some aspects, if there are two possible transmission modes, the transmission mode configuration may be indicated using a single bit (e.g., in a transmission mode field). Alternatively, the transmission mode configuration may be indicated using multiple bits (e.g., 2 bits for 3 possible transmission modes).

As shown by reference number 330, the UE 120 and the base station 110 may communicate with one another based at least in part on the indicated transmission mode configuration. For example, the UE 120 may transmit SRS to the base station 110 based at least in part on the transmission mode configuration. Such SRS may include, for example, SRS for a downlink channel state information (CSI) acquisition use case, SRS for an uplink CSI acquisition use case, and/or the like.

As indicated above, FIG. 3 is provided as an example. Other examples may differ from what was described with respect to FIG. 3.

Figure 4:
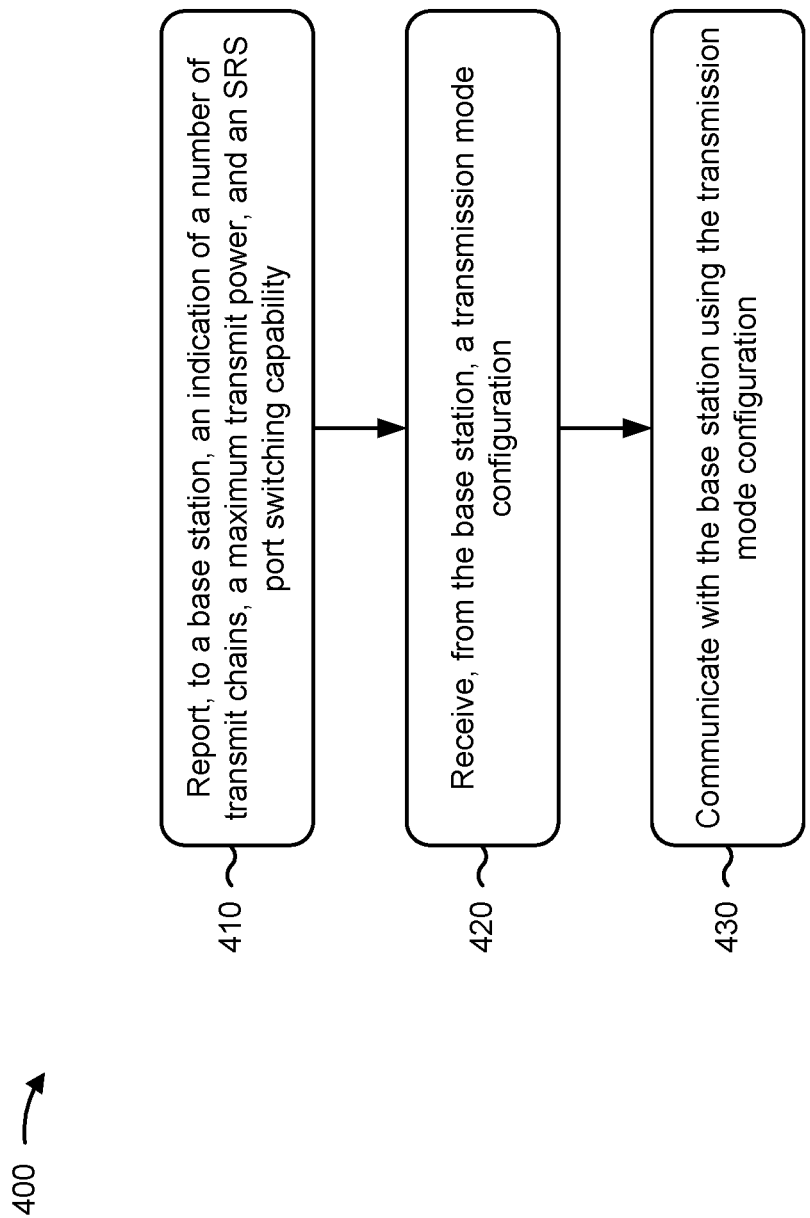
FIGS. 4-7 are flow charts of methods of wireless communication.

FIG. 4 is a flow chart of a method 400 of wireless communication. The method 400 may be performed by a UE (e.g., the UE 120, the apparatus 802/802', and/or the like).

At 410, the UE may report, to a base station, an indication of a number of transmit chains, a maximum transmit power, and a sounding reference signal (SRS) port switching capability. For example, the UE (e.g., using controller/processor 280, transmit processor 264, TX MIMO processor 266, MOD 254, antenna 252, and/or the like) may report an indication of a number of transmit chains of the UE, a maximum transmit power associated with the UE, and an SRS port switching capability of the UE, as described above in connection with FIG. 3. In some aspects, this information may be reported to a base station. In some aspects, the maximum transmit power associated with the UE includes a maximum transmit power per transmit chain. In some aspects, the maximum transmit power associated with the UE includes a maximum transmit power aggregated across all of the transmit chains.

At 420, the UE may receive, from the base station, a transmission mode configuration. For example, the UE (e.g., using antenna 252, DEMOD 254, MIMO detector 256, receive processor 258, controller/processor 280, and/or the like) may receive a transmission mode configuration based at least in part on reporting the indication, as described above in connection with FIG. 3. In some aspects, the transmission mode configuration may be received from the base station. In some aspects, the transmission mode configuration indicates at least one of: a number of transmit chains to be used by the UE, a number of receive chains to be used by the UE, a number of uplink multiple-input multiple-output (MIMO) layers for the UE, an SRS port switching configuration for the UE, a maximum transmit power aggregated across all of the transmit chains, a maximum transmit power per indicated transmit chain, or a combination thereof.

In some aspects, the transmission mode configuration indicates one of: a first transmission mode indicating a first maximum transmit power and a number of transmit chains equal to a number of receive chains, or a second transmission mode indicating a second maximum transmit power and a number of transmit chains not equal to a number of receive chains. In some aspects, the first maximum transmit power is different from the second maximum transmit power.

In some aspects, the SRS port switching configuration indicated to the UE is different from the SRS port switching capability reported by the UE. In some aspects, the SRS port switching capability reported by the UE indicates an equal number of transmit chains and receive chains. In some aspects, the SRS port switching configuration indicated to the UE indicates an unequal number of transmit chains and receive chains (e.g., a lesser number of transmit chains as compared to receive chains, such as 1T4R, 2T4R, or the like).

At 430, the UE may communicating with the base station using the transmission mode configuration. For example, the UE (e.g., using antenna 252, DEMOD 254, MIMO detector 256, receive processor 258, controller/processor 280, transmit processor 264, TX MIMO processor 266, MOD 254, and/or the like) may communicate with the base station using the transmission mode configuration, as described above in connection with FIG. 3. In some aspects, SRS for downlink channel state information (CSI) acquisition and uplink CSI acquisition are not permitted to be scheduled concurrently when an overlap between the number of transmit chains and the number of receive chains is not permitted.

Although FIG. 4 shows example blocks of a method of wireless communication, in some aspects, the method may include additional blocks, fewer blocks, different blocks, or differently arranged blocks than those shown in FIG. 4. Additionally, or alternatively, two or more blocks shown in FIG. 4 may be performed in parallel.

Figure 5:
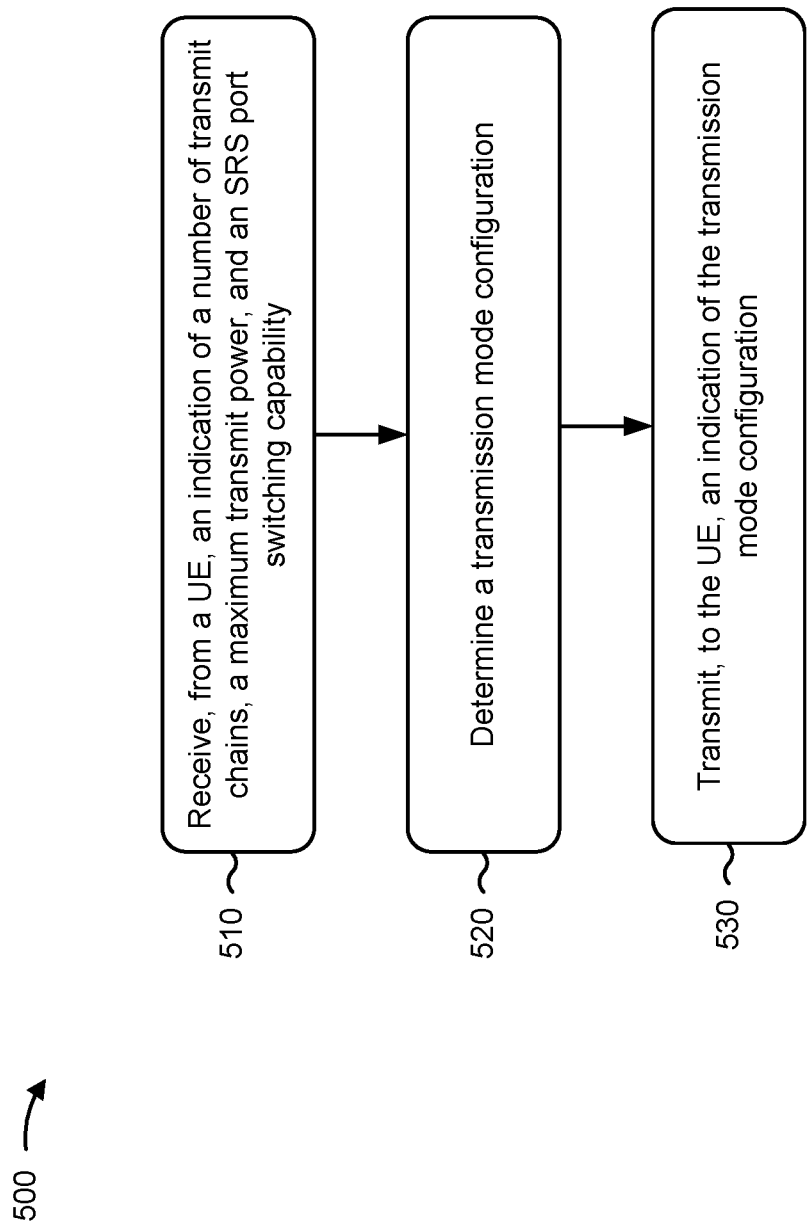

FIG. 5 is a flow chart of a method 500 of wireless communication. The method 500 may be performed by a base station (e.g., the base station 110, the apparatus 802/802', and/or the like).

At 510, the base station may receive, from a UE, an indication of a number of transmit chains, a maximum transmit power, and a sounding reference signal (SRS) port switching capability. For example, the base station (e.g., using antenna 234, DEMOD 232, MIMO detector 236, receive processor 238, controller/processor 240, and/or the like) may receive, from a UE, an indication of a number of transmit chains of the UE, a maximum transmit power associated with the UE, and a sounding reference signal (SRS) port switching capability of the UE, as described above in connection with FIG. 3. In some aspects, the maximum transmit power associated with the UE includes a maximum transmit power per transmit chain. In some aspects, the maximum transmit power associated with the UE includes a maximum transmit power aggregated across all of the transmit chains.

At 520, the base station may determine a transmission mode configuration based at least in part on the indication. For example, the base station (e.g., using controller/processor 240 and/or the like) may determine a transmission mode configuration based at least in part on the indication, as described above in connection with FIG. 3. In some aspects, the transmission mode configuration indicates at least one of: a number of transmit chains to be used by the UE, a number of receive chains to be used by the UE, a number of uplink multiple-input multiple-output (MIMO) layers for the UE, an SRS port switching configuration for the UE, a maximum transmit power aggregated across all of the transmit chains, a maximum transmit power per indicated transmit chain, or a combination thereof.

In some aspects, the transmission mode configuration indicates one of: a first transmission mode indicating a first maximum transmit power and a number of transmit chains equal to a number of receive chains, or a second transmission mode indicating a second maximum transmit power and a number of transmit chains not equal to a number of receive chains. In some aspects, the first maximum transmit power is different from the second maximum transmit power.

In some aspects, the SRS port switching configuration indicated to the UE is different from the SRS port switching capability reported by the UE. In some aspects, the SRS port switching capability reported by the UE indicates an equal number of transmit chains and receive chains. In some aspects, the SRS port switching configuration indicated to the UE indicates an unequal number of transmit chains and receive chains.

At 530, the base station may transmit, to the UE, an indication of the transmission mode configuration. For example, the base station (e.g., using controller/processor 240, transmit processor 220, TX MIMO processor 230, MOD 232, antenna 234, and/or the like) may transmit, to the UE, an indication of the transmission mode configuration, as described above in connection with FIG. 3. In some aspects, the base station may communicate with the UE based at least in part on the transmission mode configuration. In some aspects, the base station may refrain from concurrent scheduling of SRS for downlink channel state information (CSI) acquisition and uplink CSI acquisition when an overlap between the number of transmit chains and the number of receive chains is not permitted.

Although FIG. 5 shows example blocks of a method of wireless communication, in some aspects, the method may include additional blocks, fewer blocks, different blocks, or differently arranged blocks than those shown in FIG. 5. Additionally, or alternatively, two or more blocks shown in FIG. 5 may be performed in parallel.

Figure 6:
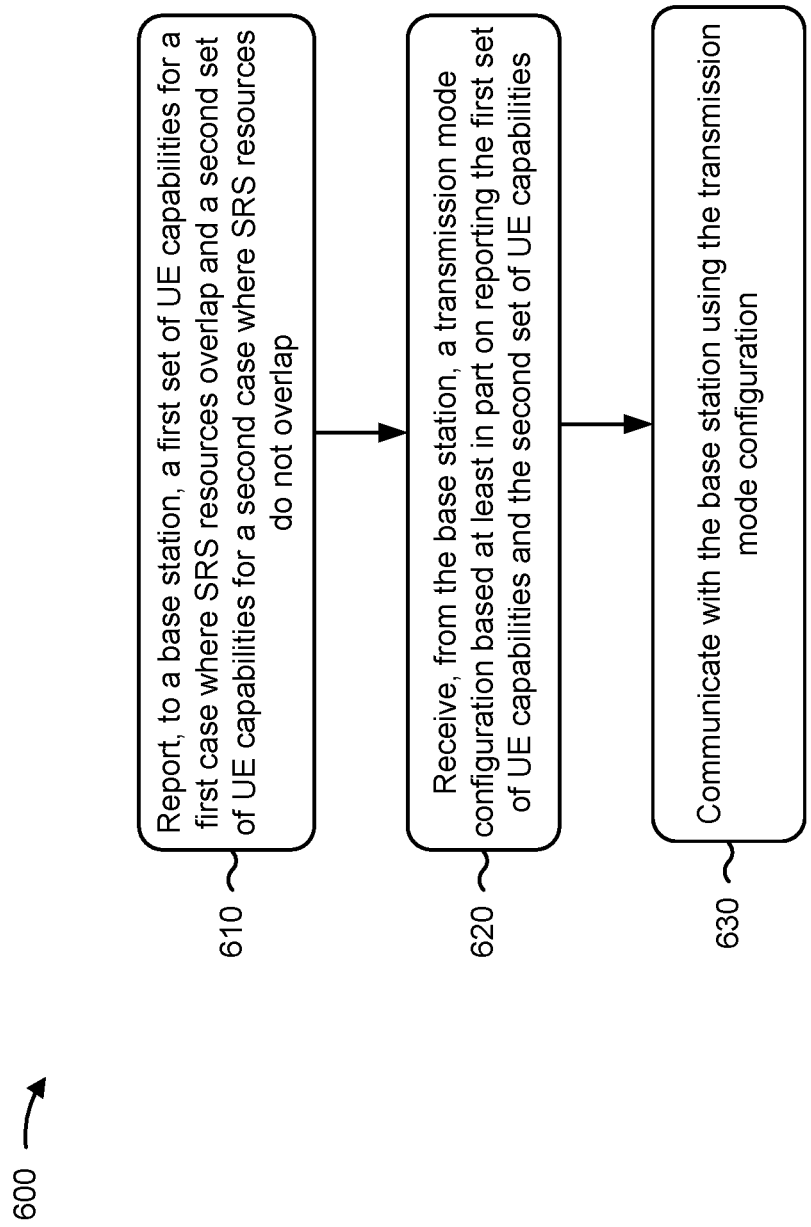

FIG. 6 is a flow chart of a method 600 of wireless communication. The method 600 may be performed by a UE (e.g., the UE 120, the apparatus 802/802', and/or the like).

At 610, the UE may report, to a base station, a first set of UE capabilities for a first case where SRS resources overlap and a second set of UE capabilities for a second case where SRS resources do not overlap. For example, the UE (e.g., using controller/processor 280, transmit processor 264, TX MIMO processor 266, MOD 254, antenna 252, and/or the like) may report, to a base station, a first set of UE capabilities for a first case where SRS resources overlap and a second set of UE capabilities for a second case where SRS resources do not overlap, in a similar manner as described above in connection with FIG. 3. In some aspects, the first set of UE capabilities and the second set of UE capabilities include an indication of a maximum transmit power for an uplink shared data channel, SRS transmissions for downlink CSI acquisition, and SRS transmissions for uplink CSI acquisition. In some aspects, the reporting is per band in a band combination.

In some aspects, each UE capability, of the first set of UE capabilities, and each UE capability, of the second set of UE capabilities, includes an indication of a respective maximum transmit power for the uplink shared data channel and for at least one of the SRS transmissions for the downlink CSI or the SRS transmissions for the uplink CSI. In some aspects, the first set of UE capabilities includes a first subset of UE capabilities and the second set of UE capabilities includes a second subset of UE capabilities, wherein the first subset and the second subset indicate support for at least one of a number of transmit chains used by the UE or a number of receive chains used by the UE, and at least one of: a maximum transmit power for the uplink shared data channel, a maximum transmit power for the SRS transmissions for downlink CSI acquisition, a maximum transmit power for the SRS transmissions for uplink CSI acquisition, or a combination thereof.

In some aspects, for a UE capability in the first set of UE capabilities for the first case where SRS resources overlap, the indicated maximum transmit power is the same for the uplink shared data channel and for at least one of the SRS transmissions for the downlink CSI or the SRS transmissions for the uplink CSI. In some aspects, for a UE capability in the second set of UE capabilities for the second case where SRS resources do not overlap, the indicated maximum transmit power is different for the uplink shared data channel and for at least one of the SRS transmissions for the downlink CSI or the SRS transmissions for the uplink CSI.

At 620, the UE may receive, from the base station, a transmission mode configuration based at least in part on reporting the first set of UE capabilities and the second set of UE capabilities. For example, the UE (e.g., using antenna 252, DEMOD 254, MIMO detector 256, receive processor 258, controller/processor 280, and/or the like) may receive, from the base station, a transmission mode configuration based at least in part on reporting the first set of UE capabilities and the second set of UE capabilities, as described above in connection with FIG. 3.

At 630, the UE may communicate with the base station using the transmission mode configuration. For example, the UE (e.g., using antenna 252, DEMOD 254, MIMO detector 256, receive processor 258, controller/processor 280, transmit processor 264, TX MIMO processor 266, MOD 254, and/or the like) may communicate with the base station using the transmission mode configuration, as described above in connection with FIG. 3.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
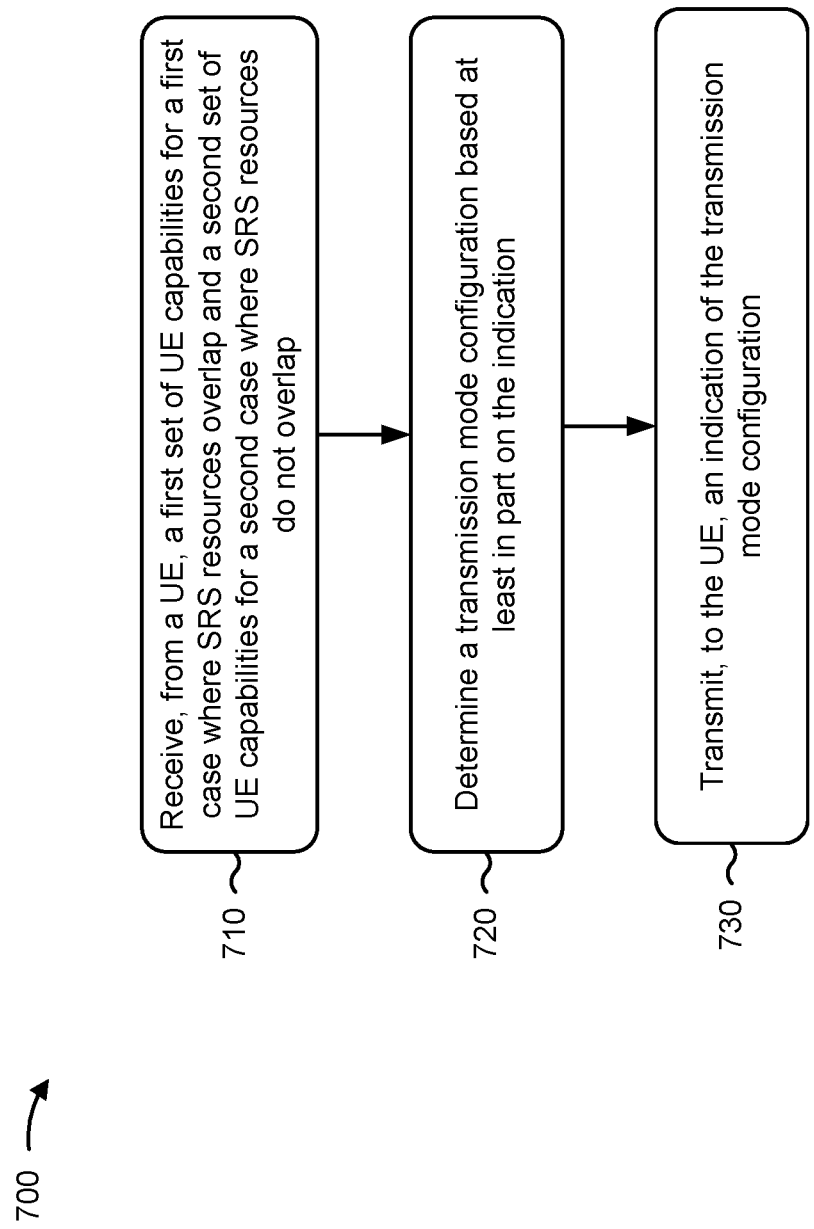

FIG. 7 is a flow chart of a method 700 of wireless communication. The method 700 may be performed by a base station (e.g., the base station 110, the apparatus 802/802', and/or the like).

At 710, the base station may receiving, from a UE, a first set of UE capabilities for a first case where SRS resources overlap and a second set of UE capabilities for a second case where SRS resources do not overlap. For example, the base station (e.g., using antenna 234, DEMOD 232, MIMO detector 236, receive processor 238, controller/processor 240, and/or the like) may receive from a UE, a first set of UE capabilities for a first case where SRS resources overlap and a second set of UE capabilities for a second case where SRS resources do not overlap, in a similar manner as described above in connection with FIG. 3. In some aspects, the first set of UE capabilities and the second set of UE capabilities include an indication of a maximum transmit power for an uplink shared data channel, SRS transmissions for downlink CSI acquisition, and SRS transmissions for uplink CSI acquisition. In some aspects, the reporting is per band in a band combination.

In some aspects, each UE capability, of the first set of UE capabilities, and each UE capability, of the second set of UE capabilities, includes an indication of a respective maximum transmit power for the uplink shared data channel and for at least one of the SRS transmissions for the downlink CSI or the SRS transmissions for the uplink CSI. In some aspects, the first set of UE capabilities includes a first subset of UE capabilities and the second set of UE capabilities includes a second subset of UE capabilities, wherein the first subset and the second subset indicate support for at least one of a number of transmit chains used by the UE or a number of receive chains used by the UE, and at least one of: a maximum transmit power for the uplink shared data channel, a maximum transmit power for the SRS transmissions for downlink CSI acquisition, a maximum transmit power for the SRS transmissions for uplink CSI acquisition, or a combination thereof.

In some aspects, for a UE capability in the first set of UE capabilities for the first case where SRS resources overlap, the indicated maximum transmit power is the same for the uplink shared data channel and for at least one of the SRS transmissions for the downlink CSI or the SRS transmissions for the uplink CSI. In some aspects, for a UE capability in the second set of UE capabilities for the second case where SRS resources do not overlap, the indicated maximum transmit power is different for the uplink shared data channel and for at least one of the SRS transmissions for the downlink CSI or the SRS transmissions for the uplink CSI.

At 720, the base station may determine a transmission mode configuration based at least in part on the indication. For example, the base station (e.g., using controller/processor 240 and/or the like) may determine a transmission mode configuration based at least in part on the indication, as described above in connection with FIG. 3.

At 730, the base station may transmit, to the UE, an indication of the transmission mode configuration. For example, the base station (e.g., using controller/processor 240, transmit processor 220, TX MIMO processor 230, MOD 232, antenna 234, and/or the like) may transmit, to the UE, an indication of the transmission mode configuration, as described above in connection with FIG. 3.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
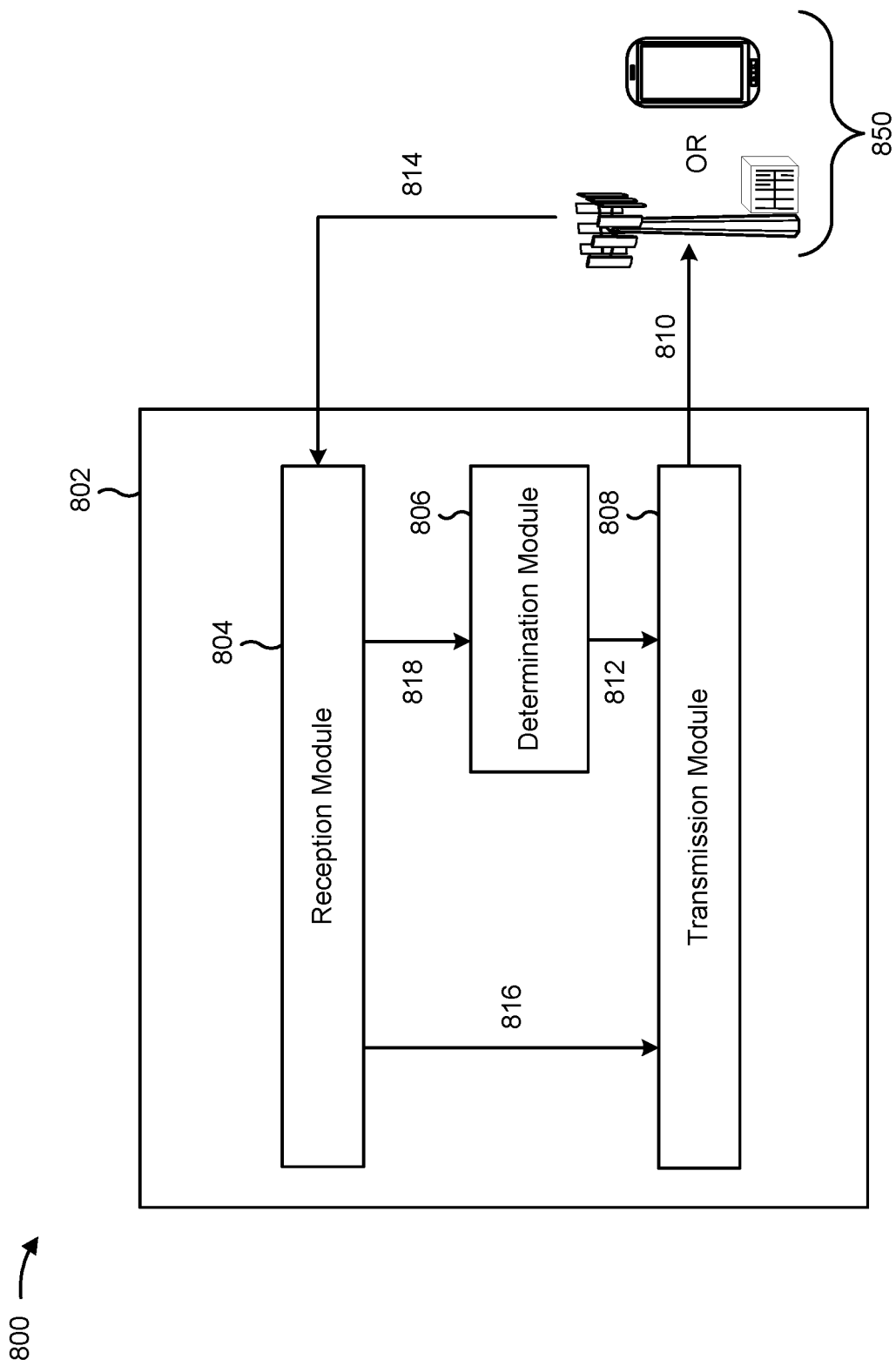
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. In some aspects, the apparatus 802 may be a UE. In some aspects, the apparatus 802 may be a base station. In some aspects, the apparatus 802 includes a reception module 804, a determination module 806, a transmission module 808, and/or the like.

In some aspects (e.g., when the apparatus 802 is a UE), the transmission module 808 may report, to an apparatus 850 (e.g., a base station) as data 810, an indication of a number of transmit chains of the apparatus 802, a maximum transmit power associated with the apparatus 802, and/or an SRS port switching capability of the apparatus 802. In some aspects, the determination module 806 may determine such information, and may provide such information to the transmission module 808, as data 812, for reporting to the apparatus 850. The reception module 804 may receive, from the apparatus 850 as data 814, a transmission mode configuration based at least in part on reporting the indication. The apparatus 802 may communicate with the apparatus 850 using the transmission mode configuration, such as by configuring one or more modules of the apparatus 802 based at least in part on the transmission mode configuration (e.g., by providing data 816 to the transmission module 808 and/or data 818 to the determination module 806).

In some aspects (e.g., when the apparatus 802 is a base station), the reception module 804 may receive, from apparatus 850 (e.g., a UE) as data 814, an indication of a number of transmit chains of the apparatus 850, a maximum transmit power associated with the apparatus 850, and/or an SRS port switching capability of the apparatus 850. The reception module may pass such information to the determination module 806 as data 818. The determination module 806 may determine a transmission mode configuration based at least in part on the indication, and may provide information associated with the transmission mode configuration to the transmission module 808 as data 812. The transmission module 808 may transmit, to the apparatus 850 as data 810, an indication of the transmission mode configuration.

The apparatus may include additional modules that perform each of the blocks of the algorithm in the aforementioned method 400 of FIG. 4, method 500 of FIG. 5, method 600 of FIG. 6, method 700 of FIG. 7, and/or the like. As such, each block in the aforementioned method 400 of FIG. 4, method 500 of FIG. 5, method 600 of FIG. 6, method 700 of FIG. 7, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
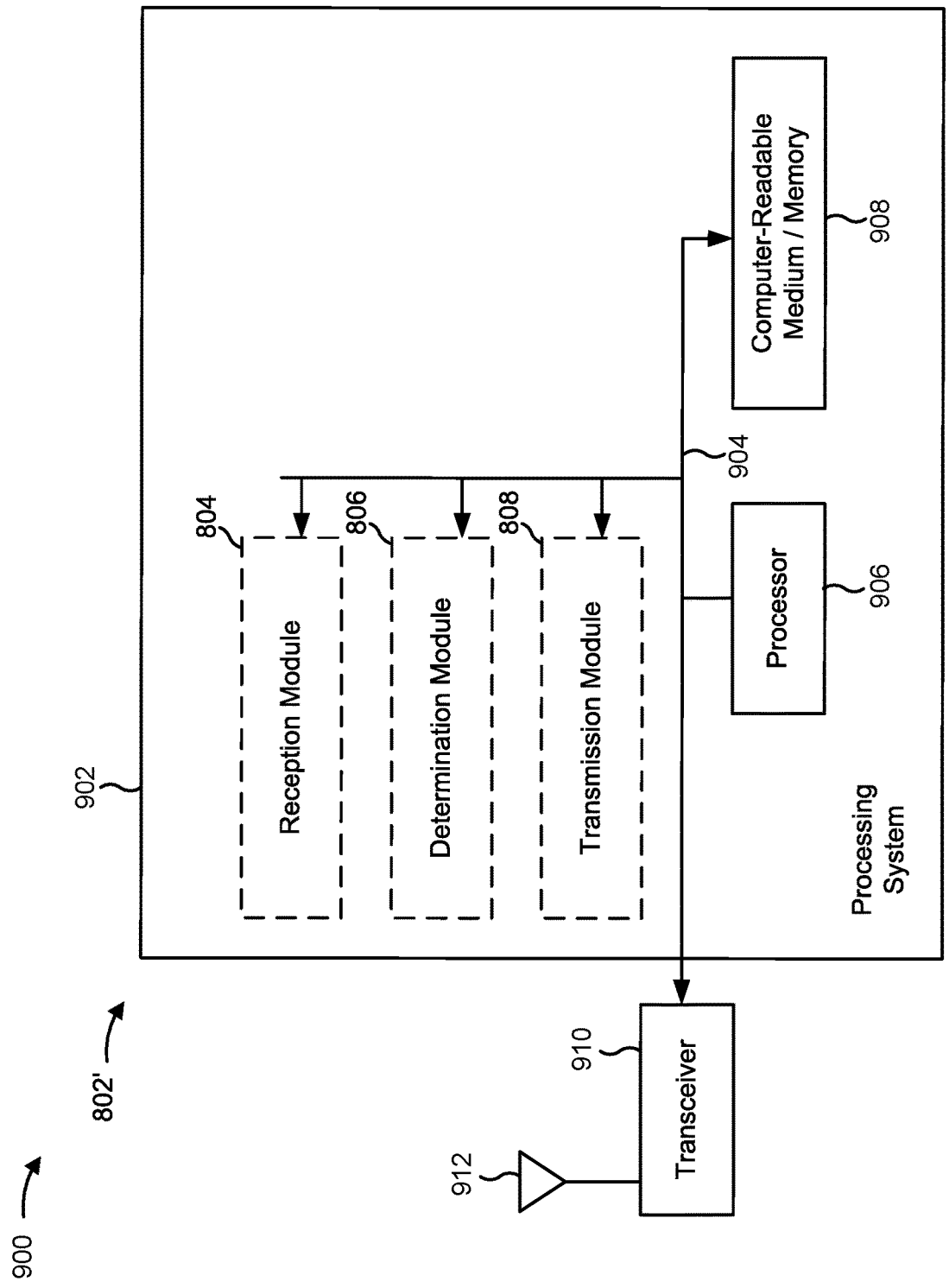
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a UE or a base station.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, and/or the like, and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described supra for any particular apparatus. The computer-readable medium/memory 908 may also be used for storing data that is manipulated by the processor 906 when executing software. The processing system further includes at least one of the modules 804, 806, 808, and/or the like. The modules may be software modules running in the processor 906, resident/stored in the computer readable medium/memory 908, one or more hardware modules coupled to the processor 906, or some combination thereof. In some aspects, the processing system 902 may be a component of the base station 110 and may include the memory 242 and/or at least one of the TX MIMO processor 230, the RX processor 238, and/or the controller/processor 240. In some aspects, the processing system 902 may be a component of the UE 120 and may include the memory 282 and/or at least one of the TX MIMO processor 266, the RX processor 258, and/or the controller/processor 280.

In some aspects, the apparatus 802/802' for wireless communication includes means for reporting, to a base station, an indication of a number of transmit chains of the UE, a maximum transmit power associated with the UE, and a sounding reference signal (SRS) port switching capability of the UE; means for receiving, from the base station, a transmission mode configuration based at least in part on reporting the indication; means for communicating with the base station using the transmission mode configuration; and/or the like. Additionally, or alternatively, the apparatus 802/802' for wireless communication includes means for reporting, to a base station, a first set of UE capabilities for a first case where SRS resources overlap and a second set of UE capabilities for a second case where SRS resources do not overlap, wherein the first set of UE capabilities and the second set of UE capabilities include an indication of a maximum transmit power for an uplink shared data channel, SRS transmissions for downlink CSI acquisition, and SRS transmissions for uplink CSI acquisition, wherein the reporting is per band in a band combination; means for receiving, from the base station, a transmission mode configuration based at least in part on reporting the first set of UE capabilities and the second set of UE capabilities; means for communicating with the base station using the transmission mode configuration; and/or the like. The aforementioned means may be one or more of the aforementioned modules of the apparatus 802 and/or the processing system 902 of the apparatus 802' configured to perform the functions recited by the aforementioned means. As described supra, the processing system 902 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

In some aspects, the apparatus 802/802' for wireless communication includes means for receiving, from a user equipment (UE), an indication of a number of transmit chains of the UE, a maximum transmit power associated with the UE, and a sounding reference signal (SRS) port switching capability of the UE; means for determining a transmission mode configuration based at least in part on the indication; means for transmitting, to the UE, an indication of the transmission mode configuration; means for communicating with the UE based at least in part on the transmission mode configuration; and/or the like. Additionally, or alternatively, the apparatus 802/802' for wireless communication includes means for receiving, from a UE, a first set of UE capabilities for a first case where SRS resources overlap and a second set of UE capabilities for a second case where SRS resources do not overlap, wherein the first set of UE capabilities and the second set of UE capabilities include an indication of a maximum transmit power for an uplink shared data channel, SRS transmissions for downlink CSI acquisition, and SRS transmissions for uplink CSI acquisition, wherein the reporting is per band in a band combination; means for determining a transmission mode configuration based at least in part on the indication; means for transmitting, to the UE, an indication of the transmission mode configuration; and/or the like. The aforementioned means may be one or more of the aforementioned modules of the apparatus 802 and/or the processing system 902 of the apparatus 802' configured to perform the functions recited by the aforementioned means. As described supra, the processing system 902 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 9 is provided as an example. Other examples may differ from what was described in connection with FIG. 9.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
reporting, to a base station, an indication of a number of transmit chains of the UE, a maximum transmit power associated with the UE, and a sounding reference signal (SRS) port switching capability of the UE;
receiving, from the base station, a transmission mode configuration based at least in part on reporting the indication, wherein the transmission mode configuration indicates at least one of:
a number of the transmit chains to be used by the UE,
a number of receive chains to be used by the UE, a number of uplink multiple-input multiple-output (MIMO) layers for the UE,
an SRS port switching configuration for the UE that is different from the SRS port switching capability reported by the UE,
a maximum transmit power aggregated across all of the transmit chains, or
a maximum transmit power per indicated transmit chain; and
communicating with the base station using the transmission mode configuration.

2. The method of claim 1, wherein the maximum transmit power associated with the UE includes at least one of the maximum transmit power per transmit chain or the maximum transmit power aggregated across all of the transmit chains.

3. The method of claim 1, wherein the SRS port switching capability reported by the UE indicates an equal number of transmit chains and receive chains, and wherein the SRS port switching configuration indicates an unequal number of transmit chains and receive chains.

4. The method of claim 1, wherein the transmission mode configuration indicates one of:
a first transmission mode indicating a first maximum transmit power and a number of transmit chains equal to a number of receive chains, or
a second transmission mode indicating a second maximum transmit power and a number of transmit chains not equal to a number of receive chains.

5. The method of claim 4, wherein the first maximum transmit power is different from the second maximum transmit power.

6. The method of claim 1, wherein the indication, of the number of transmit chains of the UE, the maximum transmit power associated with the UE, and the SRS port switching capability, is reported in a radio resource control (RRC) message.

7. The method of claim 1, wherein the transmission mode configuration is indicated in at least one of:
a radio resource control (RRC) message,
a downlink control information (DCI), or
a media access control (MAC) control element (CE).

8. A method of wireless communication performed by a base station, comprising:
receiving, from a user equipment (UE), an indication of a number of transmit chains of the UE, a maximum transmit power associated with the UE, and a sounding reference signal (SRS) port switching capability of the UE;
determining a transmission mode configuration based at least in part on the indication, wherein the transmission mode configuration indicates at least one of:
a number of the transmit chains to be used by the UE,
a number of receive chains to be used by the UE,
a number of uplink multiple-input multiple-output (MIMO) layers for the UE,
an SRS port switching configuration for the UE that is different from the SRS port switching capability reported by the UE,
a maximum transmit power aggregated across all of the transmit chains, or
a maximum transmit power per indicated transmit chain; and
transmitting, to the UE, an indication of the transmission mode configuration.

9. The method of claim 8, further comprising communicating with the UE based at least in part on the transmission mode configuration.

10. The method of claim 8, wherein the maximum transmit power associated with the UE includes at least one of the maximum transmit power per transmit chain or the maximum transmit power aggregated across all of the transmit chains.

11. The method of claim 8, wherein the SRS port switching capability reported by the UE indicates an equal number of transmit chains and receive chains, and wherein the SRS port switching configuration indicates an unequal number of transmit chains and receive chains.

12. The method of claim 8, wherein the transmission mode configuration indicates one of:
a first transmission mode indicating a first maximum transmit power and a number of transmit chains equal to a number of receive chains, or
a second transmission mode indicating a second maximum transmit power and a number of transmit chains not equal to a number of receive chains.

13. The method of claim 12, wherein the first maximum transmit power is different from the second maximum transmit power.

14. The method of claim 8, wherein the indication, of the number of transmit chains of the UE, the maximum transmit power associated with the UE, and the SRS port switching capability, is reported in a radio resource control (RRC) message.

15. The method of claim 8, wherein the transmission mode configuration is indicated in at least one of:
a radio resource control (RRC) message,
a downlink control information (DCI), or
a media access control (MAC) control element (CE).

16. A method of wireless communication performed by a user equipment (UE), comprising:
reporting, to a base station, a first set of UE capabilities for a first case where sounding reference signal (SRS) resources for downlink channel state information (CSI) acquisition and uplink CSI acquisition overlap and a second set of UE capabilities for a second case where SRS resources do not overlap, wherein the first set of UE capabilities and the second set of UE capabilities include an indication of a maximum transmit power for an uplink shared data channel, SRS transmissions for downlink CSI acquisition, and SRS transmissions for uplink CSI acquisition, wherein the reporting is per band in a band combination;
receiving, from the base station, a transmission mode configuration based at least in part on reporting the first set of UE capabilities and the second set of UE capabilities; and
communicating with the base station using the transmission mode configuration.

17. The method of claim 16, wherein each UE capability, of the first set of UE capabilities, and each UE capability, of the second set of UE capabilities, includes an indication of a respective maximum transmit power for the uplink shared data channel and for at least one of the SRS transmissions for downlink CSI acquisition or the SRS transmissions for uplink CSI acquisition.

18. The method of claim 16, wherein the first set of UE capabilities includes a first subset of UE capabilities and the second set of UE capabilities includes a second subset of UE capabilities, wherein the first subset and the second subset indicate support for at least one of a number of transmit chains used by the UE or a number of receive chains used by the UE, and at least one of:
a maximum transmit power for the uplink shared data channel,
a maximum transmit power for the SRS transmissions for downlink CSI acquisition,
a maximum transmit power for the SRS transmissions for uplink CSI acquisition, or
a combination thereof.

19. The method of claim 16, wherein, for a UE capability in the first set of UE capabilities for the first case where SRS resources for downlink CSI acquisition and uplink CSI acquisition overlap, the indicated maximum transmit power is a same for the uplink shared data channel and for at least one of the SRS transmissions for downlink CSI acquisition or the SRS transmissions for uplink CSI acquisition.

20. The method of claim 16, wherein, for a UE capability in the second set of UE capabilities for the second case where SRS resources for downlink CSI acquisition and uplink CSI acquisition do not overlap, the indicated maximum transmit power is different for the uplink shared data channel and for at least one of the SRS transmissions for downlink CSI acquisition or the SRS transmissions for uplink CSI acquisition.

21. A method of wireless communication performed by a base station, comprising:
receiving, from a user equipment (UE), a first set of UE capabilities for a first case where sounding reference signal (SRS) resources for downlink channel state information (CSI) acquisition and uplink CSI acquisition overlap and a second set of UE capabilities for a second case where SRS resources for downlink CSI acquisition and uplink CSI acquisition do not overlap, wherein the first set of UE capabilities and the second set of UE capabilities include an indication of a maximum transmit power for an uplink shared data channel, SRS transmissions for CSI acquisition, and SRS transmissions for uplink CSI acquisition, wherein the reporting is per band in a band combination;
determining a transmission mode configuration based at least in part on the indication; and
transmitting, to the UE, an indication of the transmission mode configuration.

22. The method of claim 21, wherein each UE capability, of the first set of UE capabilities, and each UE capability, of the second set of UE capabilities, includes an indication of a respective maximum transmit power for the uplink shared data channel and for at least one of the SRS transmissions for downlink CSI acquisition or the SRS transmissions for uplink CSI acquisition.

23. The method of claim 21, wherein the first set of UE capabilities includes a first subset of UE capabilities and the second set of UE capabilities includes a second subset of UE capabilities, wherein the first subset and the second subset indicate support for at least one of a number of transmit chains used by the UE or a number of receive chains used by the UE, and at least one of:
a maximum transmit power for the uplink shared data channel,
a maximum transmit power for the SRS transmissions for downlink CSI acquisition,
a maximum transmit power for the SRS transmissions for uplink CSI acquisition, or
a combination thereof.

24. The method of claim 21, wherein, for a UE capability in the first set of UE capabilities for the first case where SRS resources for downlink CSI acquisition and uplink CSI acquisition overlap, the indicated maximum transmit power is a same for the uplink shared data channel and for at least one of the SRS transmissions for downlink CSI acquisition or the SRS transmissions for uplink CSI acquisition.

25. The method of claim 21, wherein, for a UE capability in the second set of UE capabilities for the second case where SRS resources for downlink CSI acquisition and uplink CSI acquisition do not overlap, the indicated maximum transmit power is different for the uplink shared data channel and for at least one of the SRS transmissions for downlink CSI acquisition or the SRS transmissions for uplink CSI acquisition.

26. A user equipment (UE) for wireless communication, comprising:
a memory; and
one or more processors operatively coupled to the memory, the memory and the one or more processors configured to:
report, to a base station, an indication of a number of transmit chains of the UE, a maximum transmit power associated with the UE, and a sounding reference signal (SRS) port switching capability of the UE;
receive, from the base station, a transmission mode configuration based at least in part on reporting the indication, wherein the transmission mode configuration indicates at least one of:
a number of the transmit chains to be used by the UE,
a number of receive chains to be used by the UE,
a number of uplink multiple-input multiple-output (MIMO) layers for the UE,
an SRS port switching configuration for the UE that is different from the SRS port switching capability reported by the UE,
a maximum transmit power aggregated across all of the transmit chains, or
a maximum transmit power per indicated transmit chain; and
communicate with the base station using the transmission mode configuration.

27. The UE of claim 26, wherein the maximum transmit power associated with the UE includes at least one of the maximum transmit power per transmit chain or the maximum transmit power aggregated across all of the transmit chains.

28. The UE of claim 26, wherein the SRS port switching capability reported by the UE indicates an equal number of transmit chains and receive chains, and wherein the SRS port switching configuration indicates an unequal number of transmit chains and receive chains.

29. The UE of claim 26, wherein the transmission mode configuration indicates one of:
a first transmission mode indicating a first maximum transmit power and a number of transmit chains equal to a number of receive chains, or
a second transmission mode indicating a second maximum transmit power and a number of transmit chains not equal to a number of receive chains.

30. The UE of claim 29, wherein the first maximum transmit power is different from the second maximum transmit power.

31. The UE of claim 26, wherein the indication, of the number of transmit chains of the UE, the maximum transmit power associated with the UE, and the SRS port switching capability, is reported in a radio resource control (RRC) message.

32. The UE of claim 26, wherein the transmission mode configuration is indicated in at least one of:
- a radio resource control (RRC) message,
- a downlink control information (DCI), or
- a media access control (MAC) control element (CE).

33. A base station for wireless communication, comprising:
- a memory; and
- one or more processors operatively coupled to the memory, the memory and the one or more processors configured to:
  - receive, from a user equipment (UE), an indication of a number of transmit chains of the UE, a maximum transmit power associated with the UE, and a sounding reference signal (SRS) port switching capability of the UE;
  - determine a transmission mode configuration based at least in part on the indication, wherein the transmission mode configuration indicates at least one of:
    - a number of the transmit chains to be used by the UE,
    - a number of receive chains to be used by the UE,
    - a number of uplink multiple-input multiple-output (MIMO) layers for the UE,
    - an SRS port switching configuration for the UE that is different from the SRS port switching capability reported by the UE,
    - a maximum transmit power aggregated across all of the transmit chains, or
    - a maximum transmit power per indicated transmit chain; and
  - transmit, to the UE, an indication of the transmission mode configuration.

34. The base station of claim 33, wherein the one or more processors are further configured to:
- communicate with the UE based at least in part on the transmission mode configuration.

35. The base station of claim 33, wherein the maximum transmit power associated with the UE includes at least one of the maximum transmit power per transmit chain or the maximum transmit power aggregated across all of the transmit chains.

36. The base station of claim 33, wherein the SRS port switching capability reported by the UE indicates an equal number of transmit chains and receive chains, and wherein the SRS port switching configuration indicates an unequal number of transmit chains and receive chains.

37. The base station of claim 33, wherein the transmission mode configuration indicates one of:
- a first transmission mode indicating a first maximum transmit power and a number of transmit chains equal to a number of receive chains, or
- a second transmission mode indicating a second maximum transmit power and a number of transmit chains not equal to a number of receive chains.

38. The base station of claim 37, wherein the first maximum transmit power is different from the second maximum transmit power.

39. The base station of claim 33, wherein the indication, of the number of transmit chains of the UE, the maximum transmit power associated with the UE, and the SRS port switching capability, is reported in a radio resource control (RRC) message.

40. The base station of claim 33, wherein the transmission mode configuration is indicated in at least one of:
- a radio resource control (RRC) message,
- a downlink control information (DCI), or
- a media access control (MAC) control element (CE).

41. A user equipment (UE) for wireless communication, comprising:
- a memory; and
- one or more processors operatively coupled to the memory, the memory and the one or more processors configured to:
  - report, to a base station, a first set of UE capabilities for a first case where sounding reference signal (SRS) resources for downlink channel state information (CSI) acquisition and uplink CSI acquisition overlap and a second set of UE capabilities for a second case where SRS resources do not overlap, wherein the first set of UE capabilities and the second set of UE capabilities include an indication of a maximum transmit power for an uplink shared data channel, SRS transmissions for downlink CSI acquisition, and SRS transmissions for uplink CSI acquisition, wherein the reporting is per band in a band combination;
  - receive, from the base station, a transmission mode configuration based at least in part on reporting the first set of UE capabilities and the second set of UE capabilities; and
  - communicate with the base station using the transmission mode configuration.

42. The UE of claim 41, wherein each UE capability, of the first set of UE capabilities, and each UE capability, of the second set of UE capabilities, includes an indication of a respective maximum transmit power for the uplink shared data channel and for at least one of the SRS transmissions for downlink CSI acquisition or the SRS transmissions for uplink CSI acquisition.

43. The UE of claim 41, wherein the first set of UE capabilities includes a first subset of UE capabilities and the second set of UE capabilities includes a second subset of UE capabilities, wherein the first subset and the second subset indicate support for at least one of a number of transmit chains used by the UE or a number of receive chains used by the UE, and at least one of:
- a maximum transmit power for the uplink shared data channel,
- a maximum transmit power for the SRS transmissions for downlink CSI acquisition, or
- a maximum transmit power for the SRS transmissions for uplink CSI acquisition.

44. The UE of claim 41, wherein, for a UE capability in the first set of UE capabilities for the first case where SRS resources for downlink CSI acquisition and uplink CSI acquisition overlap, the indicated maximum transmit power is a same for the uplink shared data channel and for at least one of the SRS transmissions for downlink CSI acquisition or the SRS transmissions for uplink CSI acquisition.

45. The UE of claim 41, wherein, for a UE capability in the second set of UE capabilities for the second case where SRS resources for downlink CSI acquisition and uplink CSI acquisition do not overlap, the indicated maximum transmit power is different for the uplink shared data channel and for at least one of the SRS transmissions for downlink CSI acquisition or the SRS transmissions for uplink CSI acquisition.

46. A base station for wireless communication, comprising:
- a memory; and
- one or more processors operatively coupled to the memory, the memory and the one or more processors configured to:

receive, from a user equipment (UE), a first set of UE capabilities for a first case where sounding reference signal (SRS) resources for downlink channel state information (CSI) acquisition and uplink CSI acquisition overlap and a second set of UE capabilities for a second case where SRS resources for downlink CSI acquisition and uplink CSI acquisition do not overlap, wherein the first set of UE capabilities and the second set of UE capabilities include an indication of a maximum transmit power for an uplink shared data channel, SRS transmissions for CSI acquisition, and SRS transmissions for uplink CSI acquisition, wherein the reporting is per band in a band combination;

determine a transmission mode configuration based at least in part on the indication; and transmit, to the UE, an indication of the transmission mode configuration.

47. The base station of claim 46, wherein each UE capability, of the first set of UE capabilities, and each UE capability, of the second set of UE capabilities, includes an indication of a respective maximum transmit power for the uplink shared data channel and for at least one of the SRS transmissions for downlink CSI acquisition or the SRS transmissions for uplink CSI acquisition.

48. The base station of claim 46, wherein the first set of UE capabilities includes a first subset of UE capabilities and the second set of UE capabilities includes a second subset of UE capabilities, wherein the first subset and the second subset indicate support for at least one of a number of transmit chains used by the UE or a number of receive chains used by the UE, and at least one of:
 a maximum transmit power for the uplink shared data channel,
 a maximum transmit power for the SRS transmissions for downlink CSI acquisition, or
 a maximum transmit power for the SRS transmissions for uplink CSI acquisition.

49. The base station of claim 46, wherein, for a UE capability in the first set of UE capabilities for the first case where SRS resources for downlink CSI acquisition and uplink CSI acquisition overlap, the indicated maximum transmit power is a same for the uplink shared data channel and for at least one of the SRS transmissions for downlink CSI acquisition or the SRS transmissions for uplink CSI acquisition.

50. The base station of claim 46, wherein, for a UE capability in the second set of UE capabilities for the second case where SRS resources for downlink CSI acquisition and uplink CSI acquisition do not overlap, the indicated maximum transmit power is different for the uplink shared data channel and for at least one of the SRS transmissions for downlink CSI acquisition or the SRS transmissions for uplink CSI acquisition.

51. An apparatus for wireless communication, comprising:
 means for reporting, to a base station, an indication of a number of transmit chains of a user equipment (UE), a maximum transmit power associated with the UE, and a sounding reference signal (SRS) port switching capability of the UE;
 means for receiving, from the base station, a transmission mode configuration based at least in part on reporting the indication, wherein the transmission mode configuration indicates at least one of:
  a number of the transmit chains to be used by the UE,
  a number of receive chains to be used by the UE,
  a number of uplink multiple-input multiple-output (MIMO) layers for the UE,
  an SRS port switching configuration for the UE that is different from the SRS port switching capability reported by the UE,
  a maximum transmit power aggregated across all of the transmit chains, or
  a maximum transmit power per indicated transmit chain; and
 means for communicating with the base station using the transmission mode configuration.

52. An apparatus for wireless communication, comprising:
 means for receiving, from a user equipment (UE), an indication of a number of transmit chains of the UE, a maximum transmit power associated with the UE, and a sounding reference signal (SRS) port switching capability of the UE;
 means for determining a transmission mode configuration based at least in part on the indication, wherein the transmission mode configuration indicates at least one of:
  a number of the transmit chains to be used by the UE,
  a number of receive chains to be used by the UE,
  a number of uplink multiple-input multiple-output (MIMO) layers for the UE,
  an SRS port switching configuration for the UE that is different from the SRS port switching capability reported by the UE,
  a maximum transmit power aggregated across all of the transmit chains, or
  a maximum transmit power per indicated transmit chain; and
 means for transmitting, to the UE, an indication of the transmission mode configuration.

53. An apparatus for wireless communication, comprising:
 means for reporting, to a base station, a first set of user equipment (UE) capabilities for a first case where sounding reference signal (SRS) resources for downlink channel state information (CSI) acquisition and uplink CSI acquisition overlap and a second set of UE capabilities for a second case where SRS resources do not overlap, wherein the first set of UE capabilities and the second set of UE capabilities include an indication of a maximum transmit power for an uplink shared data channel, SRS transmissions for downlink CSI acquisition, and SRS transmissions for uplink CSI acquisition, wherein the reporting is per band in a band combination;
 means for receiving, from the base station, a transmission mode configuration based at least in part on reporting the first set of UE capabilities and the second set of UE capabilities; and
 means for communicating with the base station using the transmission mode configuration.

54. An apparatus for wireless communication, comprising:
 means for receiving, from a user equipment (UE), a first set of UE capabilities for a first case where sounding reference signal (SRS) resources for downlink channel state information (CSI) acquisition and uplink CSI acquisition overlap and a second set of UE capabilities for a second case where SRS resources for downlink CSI acquisition and uplink CSI acquisition do not overlap, wherein the first set of UE capabilities and the second set of UE capabilities include an indication of a maximum transmit power for an uplink shared data channel, SRS transmissions for CSI acquisition, and SRS transmissions for uplink CSI acquisition, wherein the reporting is per band in a band combination;

means for determining a transmission mode configuration based at least in part on the indication; and means for transmitting, to the UE, an indication of the transmission mode configuration.

55. A non-transitory computer-readable medium storing a set of instructions for wireless communication, the set of instructions comprising:

one or more instructions that, when executed by one or more processors of a user equipment (UE), cause the UE to:

report, to a base station, an indication of a number of transmit chains of the UE, a maximum transmit power associated with the UE, and a sounding reference signal (SRS) port switching capability of the UE;

receive, from the base station, a transmission mode configuration based at least in part on reporting the indication, wherein the transmission mode configuration indicates at least one of:

a number of the transmit chains to be used by the UE, a number of receive chains to be used by the UE, a number of uplink multiple-input multiple-output (MIMO) layers for the UE, an SRS port switching configuration for the UE that is different from the SRS port switching capability reported by the UE, a maximum transmit power aggregated across all of the transmit chains, or a maximum transmit power per indicated transmit chain; and communicate with the base station using the transmission mode configuration.

56. A non-transitory computer-readable medium storing a set of instructions for wireless communication, the set of instructions comprising:

one or more instructions that, when executed by one or more processors of a base station, cause the base station to:

receive, from a user equipment (UE), an indication of a number of transmit chains of the UE, a maximum transmit power associated with the UE, and a sounding reference signal (SRS) port switching capability of the UE;

determine a transmission mode configuration based at least in part on the indication, wherein the transmission mode configuration indicates at least one of:

a number of the transmit chains to be used by the UE, a number of receive chains to be used by the UE, a number of uplink multiple-input multiple-output (MIMO) layers for the UE, an SRS port switching configuration for the UE that is different from the SRS port switching capability reported by the UE, a maximum transmit power aggregated across all of the transmit chains, or a maximum transmit power per indicated transmit chain; and transmit, to the UE, an indication of the transmission mode configuration.

57. A non-transitory computer-readable medium storing a set of instructions for wireless communication, the set of instructions comprising:

one or more instructions that, when executed by one or more processors of a user equipment (UE), cause the UE to:

report, to a base station, a first set of UE capabilities for a first case where sounding reference signal (SRS) resources for downlink channel state information (CSI) acquisition and uplink CSI acquisition overlap and a second set of UE capabilities for a second case where SRS resources do not overlap, wherein the first set of UE capabilities and the second set of UE capabilities include an indication of a maximum transmit power for an uplink shared data channel, SRS transmissions for downlink CSI acquisition, and SRS transmissions for uplink CSI acquisition, wherein the reporting is per band in a band combination;

receive, from the base station, a transmission mode configuration based at least in part on reporting the first set of UE capabilities and the second set of UE capabilities; and communicate with the base station using the transmission mode configuration.

58. A non-transitory computer-readable medium storing a set of instructions for wireless communication, the set of instructions comprising:

one or more instructions that, when executed by one or more processors of a base station, cause the base station to:

receive, from a user equipment (UE), a first set of UE capabilities for a first case where sounding reference signal (SRS) resources for downlink channel state information (CSI) acquisition and uplink CSI acquisition overlap and a second set of UE capabilities for a second case where SRS resources for downlink CSI acquisition and uplink CSI acquisition do not overlap, wherein the first set of UE capabilities and the second set of UE capabilities include an indication of a maximum transmit power for an uplink shared data channel, SRS transmissions for CSI acquisition, and SRS transmissions for uplink CSI acquisition, wherein the reporting is per band in a band combination;

determine a transmission mode configuration based at least in part on the indication; and transmit, to the UE, an indication of the transmission mode configuration.

* * * * *